UNITED STATES PATENT OFFICE.

OTTO MEURER, OF COLOGNE, GERMANY.

PROCESS OF MAKING METAL SULFATES.

No. 920,601.  Specification of Letters Patent.  Patented May 4, 1909.

Application filed October 16, 1907. Serial No. 397,749.

*To all whom it may concern:*

Be it known that I, OTTO MEURER, manufacturer, a subject of the German Emperor, residing at Cologne-on-the-Rhine, 54–56, Mühlenbach, Germany, have invented certain new and useful Improvements in the Art of Preparing Metal Sulfates; and I do hereby declare the following to be a full, clear, and exact description of the invention, such as will enable others skilled in the art to which it appertains to make and use the same.

In German patent specifications Nos. 120822, 135182 and 166959 methods of manufacturing metal sulfates from metal sulfids (sulfid ores and minerals) are described wherein the metal sulfids are heated with exclusion of air in the presence of iron-mono-sulfid or iron bisulfid and of mono-sulfid or poly-sulfid of an alkali or a mixture of an alkali sulfate and carbon; the mass is then allowed to disintegrate in the air, whereby a self oxidation ensues, which may be aided by heating. The heating during the self oxidation is in the said methods continued until the ferric oxid formed becomes insoluble in diluted acid. The metal sulfates are then lixiviated by using diluted acid, the ferric oxid remaining undissolved.

The present invention consists in treating sulfid ores, minerals and the like with alkali sulfids or sulfates and carbon and allowing the mass to oxidize and disintegrate in the presence of air as in the previous methods. The oxidation, however, by careful heating, is only carried on until ferric oxid is formed, which remains soluble in diluted acid. This point is found by periodically removing a sample and ascertaining whether ferric oxid has been formed and whether this is still soluble in acid. As soon as a sample shows that some of the ferric oxid is becoming insoluble or only soluble with difficulty, the heating is stopped. The temperature required in this oxidizing heating depends on the nature of the ore, and is generally between 300° and 400° C. By this method of procedure, that is by heating only so long as the ferric oxid remains soluble in diluted acid the ferric oxid which was wasted in the previous method can be used for various purposes. From the metal sulfates contained in the liquor obtained by lixiviating the mass, the iron sulfate is separated as iron oxid in the known manner. By adopting this method of stopping the oxidation while the ferric oxid is still soluble, the proportion of other metals extracted as sulfates is not so large as in the previous process, because a certain proportion of the sulfids of these other metals remain unoxidized. Such unoxidized portion may afterward be subjected to further oxidation and lixiviation.

A process is already known according to which pyrites is converted into iron sulfate by self oxidation accompanied by slight heating, and the product is removed by lixiviation. I find, however, that when pyrites is thus treated ferric sulfate is alone produced by the self oxidation. By this new process wherein sulfid ores and minerals containing chiefly other metals besides the iron which latter is present as monosulfid, are used instead of pyrites, ferric sulfate is not produced, ferric oxid being the main product, because the sulfuric-acid of the ferric sulfate combines with the other metals. Moreover some ferrous sulfate is also formed, which is not the case when treating pyrites.

In this new process there is formed during the oxidation comparatively little iron sulfate, soluble in water, the greater part of the iron remaining as ferric oxid and ferrous oxid soluble in dilute acid. The reaction is thus totally different in the new process from that of the previous processes.

The following example will serve to explain the preferred manner in which this invention may be carried into effect. A zincblende very rich in iron is mixed with an alkali-sulfid and heated to the necessary extent in a muffle furnace for about three hours, a temperature corresponding to a cherry red heat being generally suitable. For 100 parts of such blende, there may be employed the alkali sulfid resulting from the reduction of 8 to 10 parts of an alkali sulfate. Thereupon the mass is removed from the furnace and exposed to the air and allowed to crumble under such atmospheric action. The mass is then washed to remove the added salts and it is then dried and finally heated at a comparatively mild temperature of from about 200 to 400° centigrade. This treatment results in the production of iron sulfates and a small quantity of iron oxids soluble in acid and very little sulfate of zinc. The soluble salts formed are thereupon washed out of the mass with dilute acid and thereupon the process of heating and washing is repeated with the residue sufficiently to remove all of the iron therefrom. By this treatment there will be left a residue of zinc-sulfid only in the mass, which is then subjected to the oxidizing operation which results in the formation of zinc-sulfate and zinc-oxid, which latter is removed by dissolving the same in acids.

It will be seen from the above example that, under my invention, a metal sulfid ore containing iron sulfids, for example, is first oxidized in such a way as to render the metals of the gangue and other metallic impurities soluble so that they can be removed from the ore prior to oxidizing the sulfid of the metal to be converted into a sulfate. Specifically, this invention enables the iron compounds accompanying such metal sulfids to be removed, by converting them into compounds soluble in dilute acids, substantially before the conversion of the metal sulfid into a sulfate takes place. Thus, while in the prior art of obtaining metal sulfates from metal sulfid ores the iron impurities of the ore remained in the residue as insoluble products which could not be further utilized, under my invention the iron is separated from the other metals in the form of soluble compounds, which may be removed from the other metals by lixiviation in a marketable form. This result is due to the fact that under my invention the mass is not heated sufficiently to produce insoluble iron compounds.

What I claim is:

1. A process of manufacturing metal sulfates from sulfids containing iron mono-sulfid which process consists in first heating the sulfids with alkali sulfid, then exposing the mass to air until self oxidation has proceeded only so far that the ferric oxid produced remains soluble in dilute acid, and finally lixiviating the mass, substantially as described.

2. A process of manufacturing metal sulfates from sulfids containing iron mono-sulfid which process consists in first heating the sulfids with alkali sulfid, then exposing the mass to air until self oxidation has proceeded only so far that the ferric oxid produced remains soluble in dilute acid, then lixiviating the mass, then again exposing the residue to air and finally again lixiviating this residue, substantially as described.

In testimony whereof I have hereunto affixed my signature in the presence of two witnesses.

OTTO MEURER.

Witnesses:
   LOUIS VANDORY,
   M. KNEPPERS.